(12) United States Patent
Barker

(10) Patent No.: US 7,063,356 B2
(45) Date of Patent: Jun. 20, 2006

(54) PIPE COUPLING

(75) Inventor: Malcolm Thomas Barker, Benoni (ZA)

(73) Assignee: Amidex Coupling Systems (PTY) Ltd., Gagteng (ZA)

( * ) Notice: Subject to any disclaimer, the term of this patent is extended or adjusted under 35 U.S.C. 154(b) by 88 days.

(21) Appl. No.: 10/466,500

(22) PCT Filed: Mar. 28, 2001

(86) PCT No.: PCT/IB01/00503

§ 371 (c)(1),
(2), (4) Date: Oct. 9, 2003

(87) PCT Pub. No.: WO02/057680

PCT Pub. Date: Jul. 25, 2002

(65) Prior Publication Data

US 2004/0051315 A1 Mar. 18, 2004

(30) Foreign Application Priority Data

Jan. 19, 2001 (ZA) .......................... 2001/0564

(51) Int. Cl.
*F16L 35/00* (2006.01)

(52) U.S. Cl. .................. 285/96; 285/105; 285/906; 285/113

(58) Field of Classification Search .......... 285/96, 285/104, 105, 106, 101, 113, 906
See application file for complete search history.

(56) References Cited

U.S. PATENT DOCUMENTS

| | | | | |
|---|---|---|---|---|
| 2,478,149 A | * | 8/1949 | Wolfram et al. | 285/342 |
| 3,097,866 A | * | 7/1963 | Iversen | 285/18 |
| 3,278,193 A | * | 10/1966 | Stanley et al. | 279/4.09 |
| 3,713,204 A | * | 1/1973 | Arnold | 29/460 |
| 3,713,675 A | * | 1/1973 | White, Jr. | 285/3 |
| 3,843,167 A | * | 10/1974 | Gronstedt | 285/18 |
| 3,997,199 A | * | 12/1976 | Arnold | 285/322 |
| 4,006,921 A | * | 2/1977 | Mohr | 285/18 |
| 4,178,020 A | * | 12/1979 | Dopyera | 285/18 |
| 4,679,830 A | * | 7/1987 | Kok | 285/323 |
| 4,761,023 A | * | 8/1988 | Troxell, Jr. | 285/18 |
| 4,919,457 A | | 4/1990 | Moretti | |
| 5,863,078 A | | 1/1999 | Ball | |
| 5,911,447 A | | 6/1999 | Ball | |
| 6,447,018 B1 | | 9/2002 | Ball | |

FOREIGN PATENT DOCUMENTS

| | | |
|---|---|---|
| EP | 0 863 356 | 9/1998 |
| EP | 0 989 350 | 3/2000 |
| GB | 2 280 006 | 1/1995 |
| WO | WO 95/27868 | 10/1995 |
| WO | WO97/03314 | 1/1997 |
| WO | WO 00/25055 | 5/2000 |

* cited by examiner

*Primary Examiner*—Eric K. Nicholson
(74) *Attorney, Agent, or Firm*—Buchanan Ingersoll PC

(57) ABSTRACT

A pipe coupling (10) for joining together the ends of two adjacent pipes includes a housing (12) which defines a generally central bore (13) along a central axis of the housing for receiving the ends of the two adjacent pipes, and a locking arrangement (14) at each end of the housing (12) for locking the pipes to the coupling. Each locking arrangement (14) includes an annular chamber (23) within the housing, an inlet for allowing fluid into the chamber, an outlet for allowing fluid out of the chamber, and an annular seal (24) which is arranged to move within the annular chamber axially of the housing. A locking ring (26) is provided between the annular seal (24) and a plurality of radially movable grippers (30) for locking the grippers to a pipe end within the housing. The locking ring (26) includes a sloping inner surface (28) which is engageable with a corresponding sloping outer surface (32) on each of the grippers (30) so that axial displacement of the locking ring under fluid pressure within the annular chamber (23) causes radial displacement of the grippers (30) towards the central axis of the housing (12) for clamping the pipe end within the housing.

7 Claims, 5 Drawing Sheets

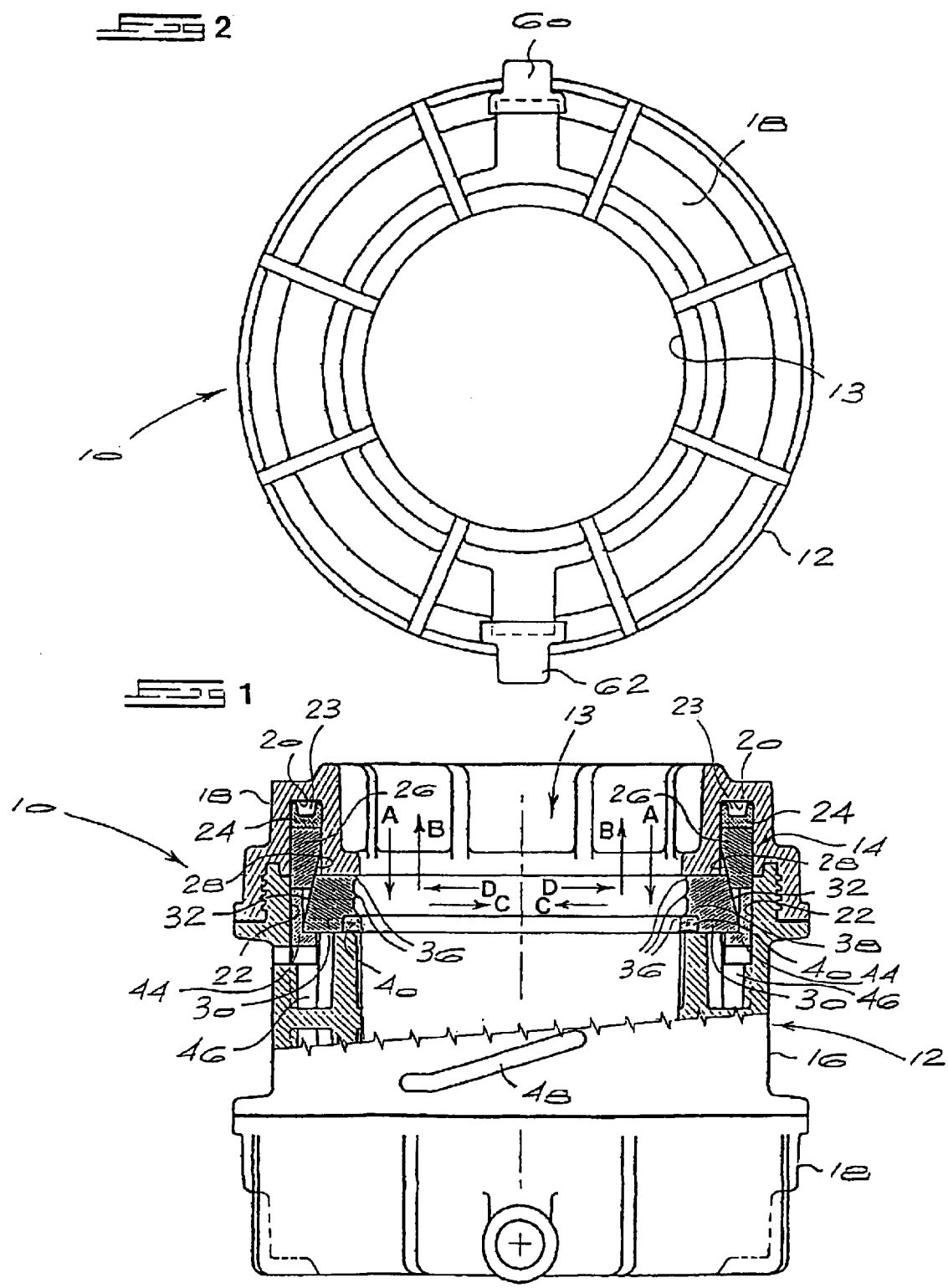

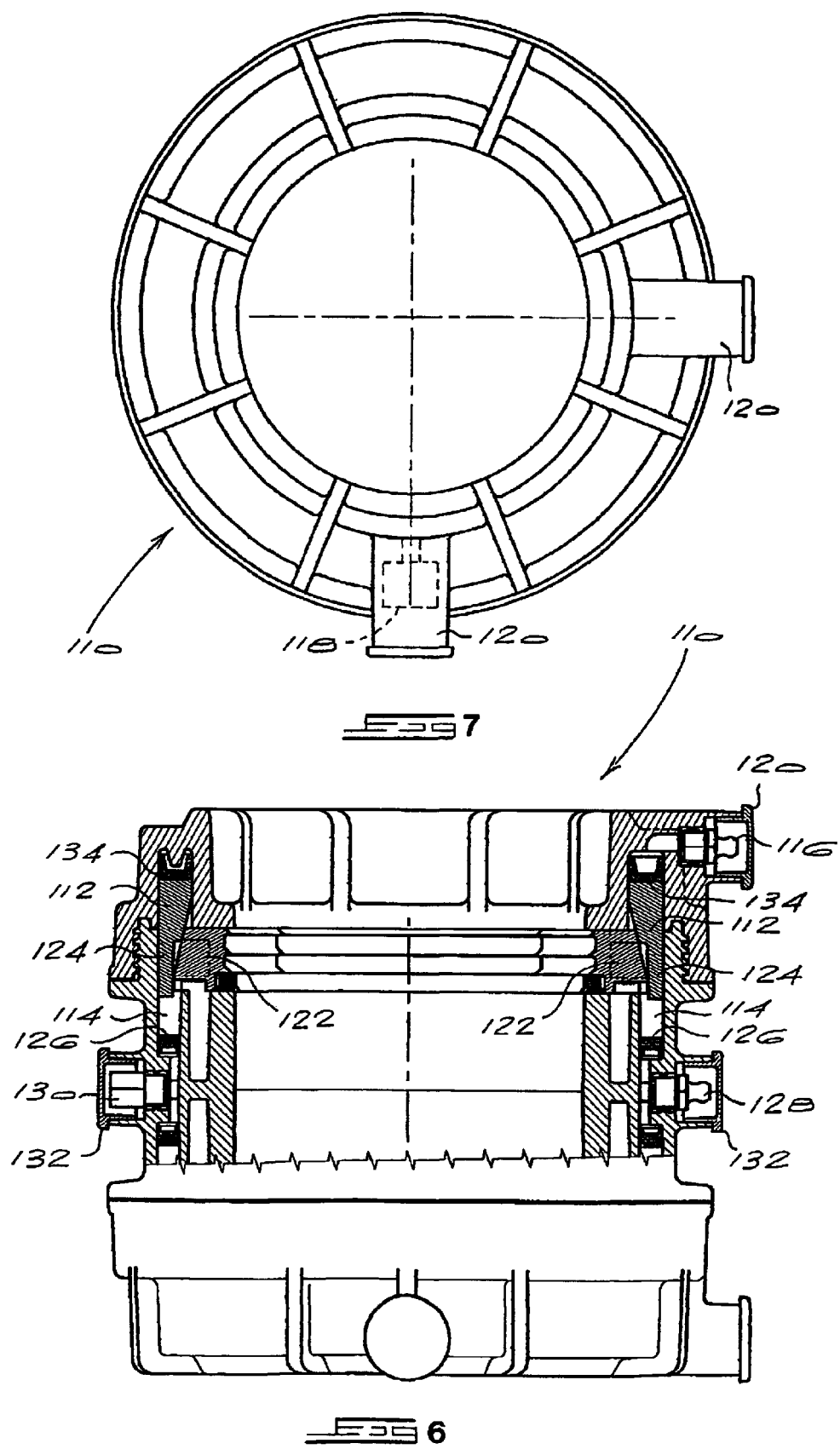

PIPE COUPLING

BACKGROUND OF THE INVENTION

THIS invention relates to a pipe coupling. More specifically, the invention relates to a coupling which is designed to join together two adjacent pipes for conveying liquid under pressure.

Various different types of pipe couplings are known. Many of the known types of couplings include bolts or other similar fasteners which have to be installed in a particular manner or sequence and this complicates the installation of the coupling. In practice, users often fail to comply fully with the correct installation procedure with the result that these couplings are not always installed with maximum effectiveness. Apart from this, bolts on couplings tend to corrode with time and this can affect subsequent re-use of the coupling. Furthermore, conventional pipe couplings often allow for movement of adjacent pipes within the coupling, i.e. they are not end restraining, and this can lead to weeping at the joint over time.

It is an object of the present invention to provide an alternative pipe coupling which is relatively easy to install and remove for re-use, which does not include any bolts or other similar fasteners, and which is fully end restraining.

SUMMARY OF THE INVENTION

According to the invention there is provided a pipe coupling for joining together the ends of two adjacent pipes, the coupling including a housing which defines a generally central bore along a central axis of the housing for receiving the ends of the two adjacent pipes, and a locking arrangement at each end of the housing for locking the pipes to the coupling, each locking arrangement including:
  an annular chamber within the housing;
  an inlet for allowing fluid into the chamber;
  an outlet for allowing fluid out of the chamber;
  an annular seal which is arranged to move within the annular chamber axially of the housing;
  a plurality of radially movable grippers; and
  at least one locking element between the annular seal and the grippers for locking the grippers to a pipe end within the housing, the or each locking element including a sloping inner surface which is engageable with a corresponding sloping outer surface on at least one of the grippers so that axial displacement of the at least one locking element under fluid pressure within the annular chamber causes radial displacement of the grippers towards the central axis of the housing for clamping the pipe end within the housing.

Typically, the coupling includes elastomeric seals which are operatively deformed by the grippers to seal between the pipe ends and the housing.

In a preferred embodiment of the invention, a grease nipple is attached or attachable to each chamber inlet and a pressure release mechanism is attached or attachable to each chamber outlet. In this way, grease can be introduced into each of the annular chambers under pressure with a grease gun or other similar device until the pressure within each chamber reaches a predetermined magnitude, typically slightly higher than the pressure required to effect locking of the grippers to the pipe ends.

Each locking element may comprise a locking ring which defines a tapered inner surface for engaging the grippers.

The coupling may also include means for dislodging the locking elements from the grippers so as to allow the grippers to disengage the pipe ends and release the pipes for removal from the coupling.

In one form of the invention, the locking element dislodging means comprises a pair of rings each of which is arranged to rotate along a pair of ramps within the housing so that suitable rotation of the rings relative to the housing causes the locking elements to be dislodged from the grippers.

In another arrangement, the locking element dislodging means comprises a pair of seals which is engageable with the locking elements or an extension of the locking elements and a further grease nipple in fluid communication with the annular chamber so that as grease is introduced into the annular chamber under pressure through the further grease nipple the seals apply loads to the locking elements and cause them to dislodge from the grippers.

BRIEF DESCRIPTION OF THE DRAWINGS

The invention will now be described in more detail, by way of example only, with reference to the accompanying drawings in which:

FIG. 1 shows a partially cut away side view of a pipe coupling according to the present invention;

FIG. 2 shows an end view of the coupling illustrated in FIG. 1;

FIG. 6 shows a partially cut away side view of a pipe coupling according to another embodiment of the invention in an unlocked, inoperative condition;

FIG. 7 shows an end view of the coupling illustrated in FIG. 6;

DESCRIPTION OF THE PREFERRED EMBODIMENTS

Figure 3:
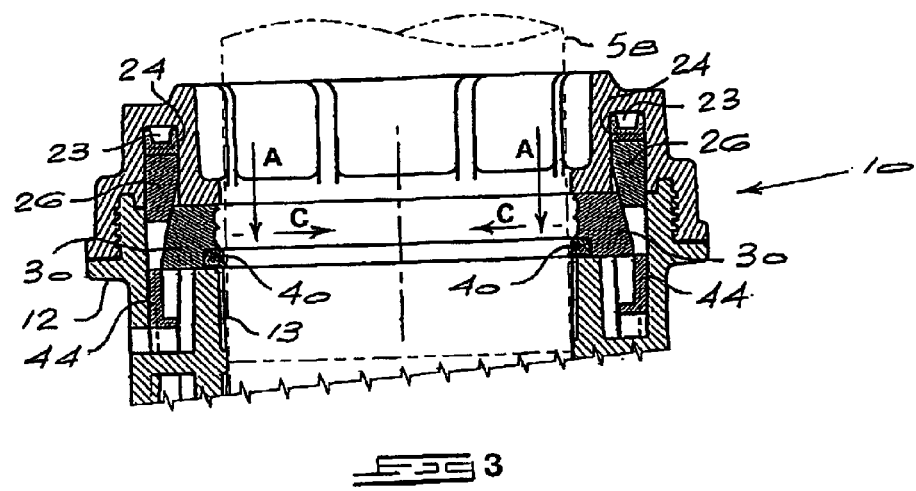
FIG. 3 shows a cross-sectional view of a portion of the coupling in an inoperative condition.

The coupling 10 illustrated in FIG. 1 of the drawings is designed to join together two adjacent pipes (not shown) for conveying liquid under pressure. In the illustrated embodiment, the coupling 10 is formed from a plastics material, typically a glass reinforced polyamide, and includes a housing 12 defining a central bore 13 for receiving the ends of the pipes, and a locking arrangement 14 at each end of the housing (only one of which is visible in FIG. 1).

The housing 12 consists of a central body portion 16 and two end caps 18 which are threadably engageable with the central body, as shown. Each end cap 18 includes an annular opening 20 which is alignable with an opening 22 in the body 16 to form an annular chamber 23 within the housing. The chamber is formed by radially spaced inner and outer walls 23a, 23b of the housing and surrounds the central bore 13.

The reference number 24 designates an annular, dynamic hydraulic seal which is movable axially relative to the housing 12 in the directions of the arrows A and B. Also movable in the directions of the arrows A and B is a locking ring 26 which defines a tapered inner surface 28. Four grippers 30 are arranged around the bore 13 so as to be movable radially within the housing in the directions of the arrows C and D. Each gripper 30 defines a sloping outer surface 32 which is designed to engage a portion of the tapered inner surface 28 on the locking ring 26, and three sharpened ribs 36 which form teeth for gripping the end of a pipe inserted into the bore 13. A rebated edge 38 in each gripper defines a seat for an a circumferential, elastomeric seal 40 which is designed to seal between the pipe end and the housing, in use.

Below the locking ring 26 in FIG. 1 is a locking ring release mechanism comprising a ring 44 which is rotatable relative to the housing 12 along a pair of ramps 46. The ring 44 is designed so that rotation thereof in one direction causes it to be displaced axially in the direction of the arrow A and rotation thereof in the opposite direction causes it to be displaced in the direction of the arrow B. Typically, a slot 48 is provided in the housing 12 and an opening (not shown) is provided in the ring 44 for receiving a shaft 49 on a purpose-made tool 50 (see FIG. 5) thereby to allow for the manual rotation of the ring, in use.

The manner in which the coupling 10 is connected to and disconnected from a pair of adjacent pipes will now be described with reference to FIGS. 3, 4 and 5 of the accompanying drawings.

Figure 4:
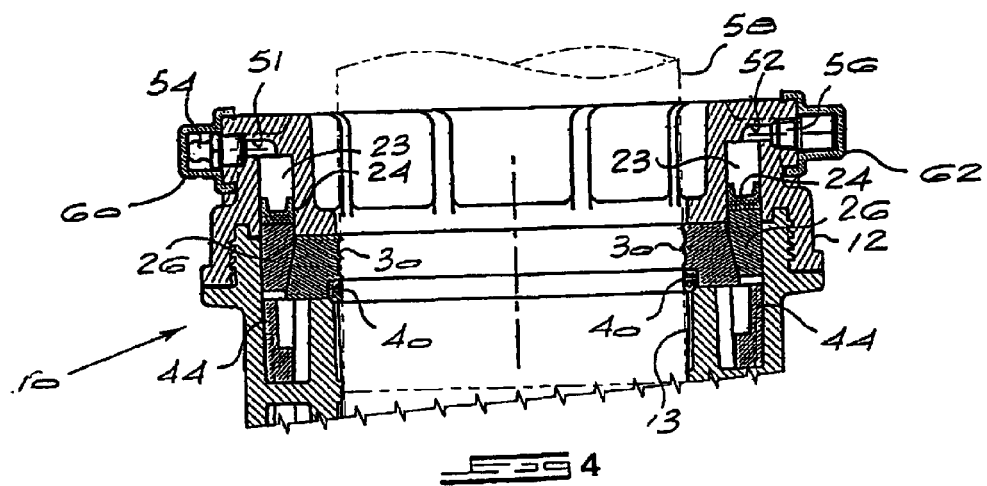
FIG. 4 shows a cross-sectional view of a portion of the coupling in an operative condition.

With particular reference first to FIG. 4, the coupling 10 is seen to include an inlet 51 which leads into each annular chamber 23 and an outlet 52 which leads from each annular chamber. A grease nipple 54 is located in the inlet, as shown, and allows grease to be introduced into the chamber 23 with a grease gun or other similar device. In this embodiment, the grease nipple is threadably attachable to the housing 12 so as to be removable from the housing. A pressure release mechanism 56 allows the grease to exit the chamber 23 when the pressure within the chamber reaches a predetermined magnitude.

In practice, the coupling 10 is used to join together the ends of two adjacent pipes 58. In FIGS. 3 and 4 only one of the pipes 58 is shown, but it will be appreciated that a similar pipe is connected to the other end of the coupling in a fashion similar to that described immediately below.

First, the end of one of the pipes 58 is inserted into the bore 13 so as to extend to a central region of the housing 12, as illustrated. This condition of the coupling is illustrated in FIG. 3. A conventional grease gun (not shown) is then connected to the grease nipple 54 and actuated so as to introduce grease into the annular chamber 23 via the inlet 51. Where it is not practical to use a grease gun, for example on relatively long pipelines, a device capable of releasing grease at a faster rate would typically be used. As the grease enters the chamber 23, it first fills the chamber and then applies hydraulic pressure to the seal 24 so as to drive this seal and hence the locking ring 26 in the direction of the arrow A in FIG. 3. As the locking ring is displaced in the direction of the arrow A its tapered surface 28 interacts with the surfaces 32 on the grippers 30 so as to drive the grippers radially inwardly in the direction of the arrows C into locking engagement with the end of the pipe 58. The inward movement of the grippers 30 deforms the sealing ring 40 to form a seal between the end of the pipe 58 and the housing 12, as shown in FIG. 4.

The pressure release mechanism 56 is designed to release grease from the chamber 23 when the pressure in the chamber reaches a predetermined pressure at which the grippers 30 are firmly clamped to the end of the pipe 58 and are locked in position by the locking ring 26. This condition of the coupling is illustrated in FIG. 4 in which the locking ring is seen to be firmly wedged between the grippers 30 and the housing 12. The friction forces between the grippers and the locking ring hold the locking ring in position so that it is not necessary to maintain the predetermined pressure within the chamber 23. This is advantageous because the pressure can then attenuate with time with no adverse effect on the integrity and efficiency of the coupling.

Once the pipe 58 has been locked in the coupling 10 in the manner described above, protective covers 60 and 62 are placed over the grease nipple 54 and the pressure release mechanism 56 to protect these, in use. Thereafter, the other pipe is inserted into the opposite end of the coupling 10 so as to butt against the end of the pipe 58 and the coupling is locked to the pipe in a similar manner to that described above.

Figure 5:
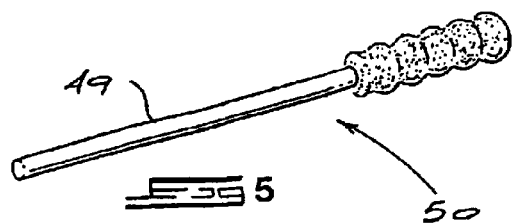
FIG. 5 shows a perspective view of a purpose-made tool for releasing the coupling from a pipe end.

If the coupling 10 is required for re-use, it can be disconnected from the pipe ends by removing the grease nipple 54, inserting the shaft 49 of the purpose-made tool 50 illustrated in FIG. 5 into the slot 48 (see FIG. 1) and rotating the ring 44 so as to drive the locking ring 26 back into the FIG. 3 position. As the locking ring is driven into the FIG. 3 position, the grippers 30 are allowed to dislodge from the end of the pipe 58 and the pipe can be removed from the housing.

Figure 8:
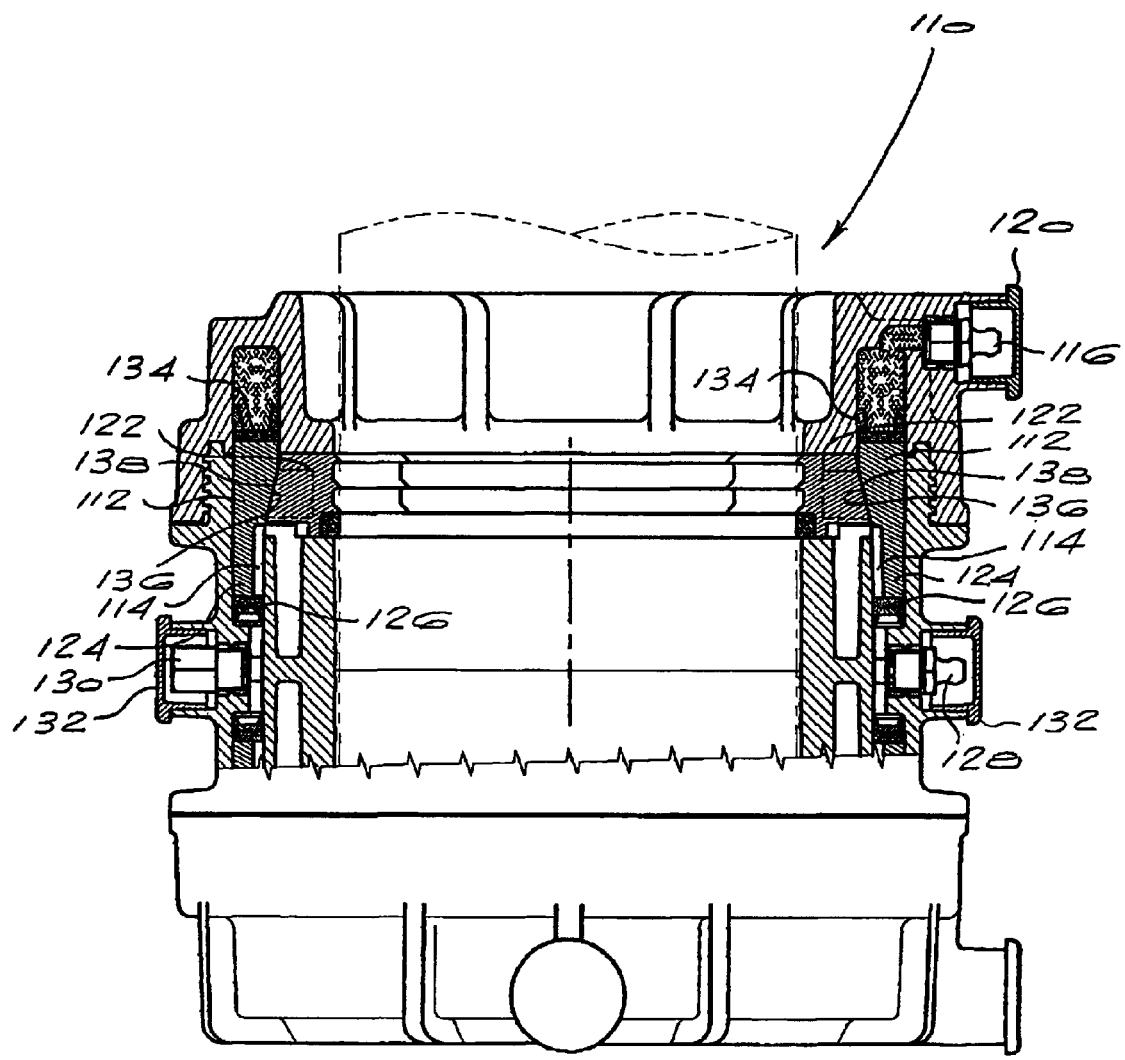
FIG. 8 shows a view similar to that of FIG. 6 with the coupling in a locked, operative condition.
Figure 9:
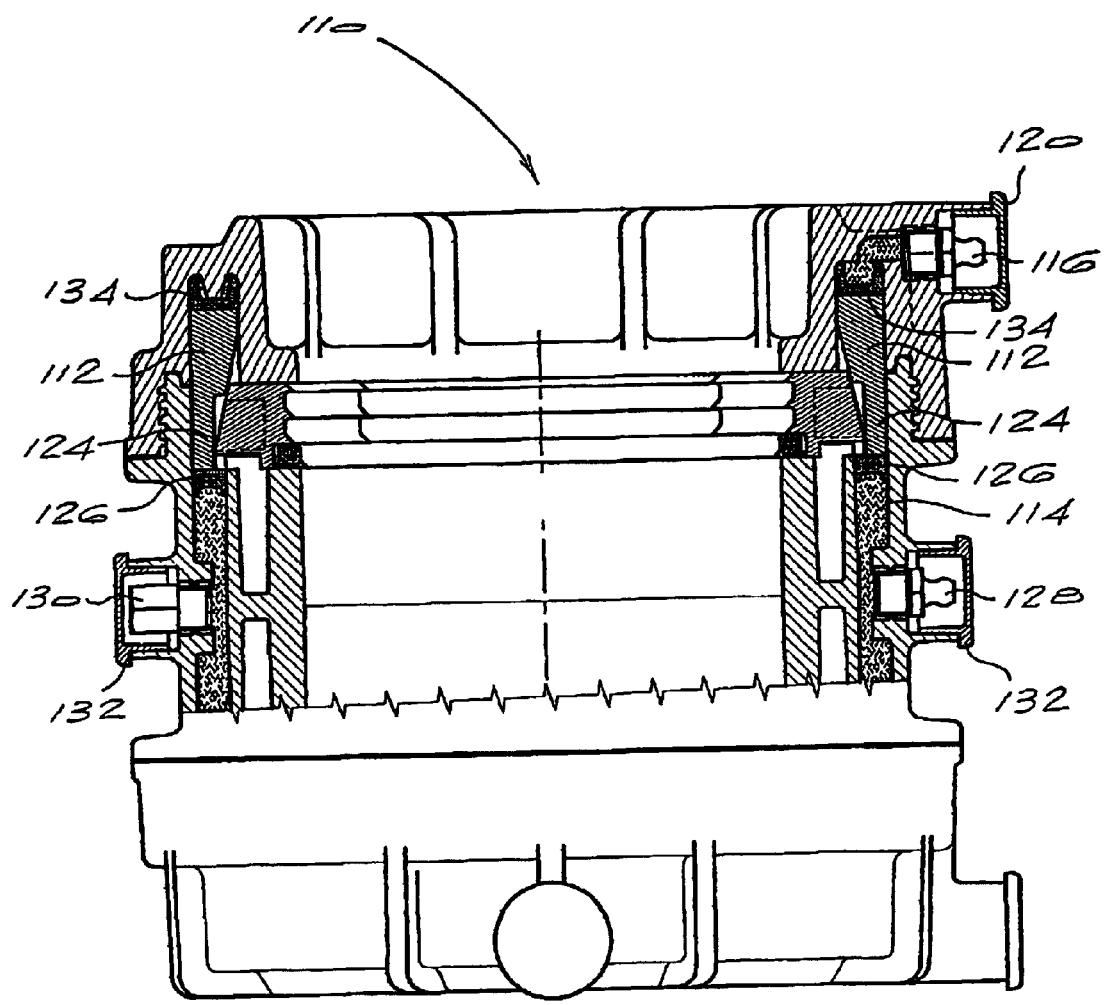
FIG. 9 shows the pipe coupling of FIG. 8 after removal for re-use.

FIGS. 6 to 9 illustrate a pipe coupling 110 according to another embodiment of the invention. The coupling 110 is similar in many respects to the coupling 10 described above with reference to FIGS. 1 to 5 of the drawings and also includes, at each end, a locking ring 112 which is movable within an annular chamber 114 between an unlocked, inoperative condition (as illustrated in FIG. 6) and a locked, operative condition (as illustrated in FIG. 8). Also similar to the previous embodiment, the coupling 110 includes a grease nipple 116 at each end for allowing grease into the chamber 114, and a pressure release mechanism 118 (see FIG. 7) for allowing grease out of this chamber. The grease nipple 116 and the mechanism 118 are seen to be provided with protective covers 120. The coupling 110 also includes grippers 122 which are displaceable radially by the locking ring 112.

However, in the FIGS. 6 to 9 embodiment, the locking ring 112 includes an integral collar 124 which is arranged to extend past the grippers, as illustrated. An annular seal 126 is arranged to slide along the chamber 114 and is in fluid communication with a grease nipple 128 and an associated pressure release mechanism 130. The nipple 128 and the mechanism 130 also have protective covers 132, as shown.

In use, the locking ring 112 is displaced from the unlocked, FIG. 6 condition to the locked, FIG. 8 condition by introducing grease into the annular chamber 114 through the grease nipple 116 in a similar manner to that described above with reference to the first embodiment of the invention. As the grease enters the chamber 114 it applies pressure to a seal 134 which in turn displaces the locking ring 112 into the locked condition, and as the locking ring is displaced, a tapered surface 136 (see FIG. 8) on the locking ring interacts with a tapered surface 138 on the grippers 122 so as to effect radial displacement of the grippers into contact with the wall of a pipe (not shown) within the coupling. The pressure release mechanism 118 serves to regulate the pressure within the chamber 114 and indicates to a user when the pipe is locked in the coupling. Another pipe is then connected to the opposite end of the coupling in a similar manner and the covers 120 and 132 are placed over the grease nipples and the pressure release mechanisms.

If the coupling is required for re-use at a later stage, the covers 120 and 132 are removed, the grease nipple 116 is detached, and grease is inserted into the chamber 114 through the nipple 128. As the grease enters the chamber 114 it applies pressure to the annular seal 126 which in turn displaces the locking ring 112 back into the unlocked condition illustrated in FIG. 9, and as the locking ring is displaced, grease within the chamber 114 is discharged through the inlet opening vacated by the nipple 116. This then allows for the dislodgement of the grippers 122 and the removal of the coupling for re-use. Before connecting the coupling to another set of pipes, the grease nipple 116 is reconnected and the grease nipple 128 is detached from the coupling. The pressure release mechanism 130 serves a safety function by releasing grease from the chamber 114 in the event that a user fails to remove the grease nipple 128 prior to reconnecting the coupling 110 to a new set of pipes. In this regard, the mechanism 130 is set to release grease from the chamber 114 once the pressure in the chamber rises above a predetermined magnitude, typically less than that associated with the mechanism 118.

It should be appreciated that the couplings 10 and 110 do not require complicated installation procedures and are easily installed on site, without it being necessary for a user to understand how the coupling works, by merely feeding the end of a pipe into the coupling and subsequently introducing grease into the coupling housing through the grease nipple 54, 116 until the grease is discharged through the pressure release mechanism 56, 118.

Furthermore, the coupling of the invention is essentially a one-piece unit with no loose parts that can be misplaced or lost on site. Also, the fact that there are no bolts or other similar fasteners on the coupling means that apart from avoiding the difficulties associated with the proper installation of conventional couplings with bolts, which often requires fastening in a particular manner and/or sequence, problems associated with corrosion of bolts is also avoided. In addition, the coupling is extremely easy to disconnect from the pipes for re-use, if necessary.

Another feature of the coupling of the invention is that it is fully end restraining thereby eliminating movement in the joint area and possible weeping of the joint over time.

Yet another advantage of the coupling according to the invention is that it automatically aligns the butted pipe ends so as to reduce turbulence at the joint.

The coupling has the further advantage of producing a uniform clamping force over the entire circumference of the pipe end which deforms out of round plastics pipe ends into circular shape. When steel pipes are used (in which case the coupling is also formed from steel) the grippers move independently of one another to accommodate out of round pipe ends.

What is claimed is:

1. A pipe coupling for joining together the ends of two adjacent pipes, the coupling including a housing which defines a generally central bore along a central axis of the housing for receiving the ends of the two adjacent pipes, and a locking arrangement at each end of the housing for locking the pipes to the coupling, each locking arrangement including:

an annular chamber within the housing;

an annular, dynamic seal which is movable within the annular chamber, axially of the housing;

an inlet for allowing fluid into the annular chamber;

an outlet for allowing fluid out of the annular chamber and out of the housing;

a plurality of radially movable grippers;

at least one locking element between the dynamic seal and the grippers for locking the grippers to a pipe end within the housing, the at least one locking element including a sloping inner surface which is engageable with a corresponding sloping outer surface on at least one of the grippers so that axial displacement of the at least one locking element under the force of a pressurized actuation medium within the annular chamber causes radial displacement of the grippers towards the central axis of the housing for clamping the pipe end within the housing; and a pressure release mechanism arranged to release actuation medium from the annular chamber and from the housing through the outlet when the pressure thereof within the annular chamber reaches a predetermined magnitude at which the grippers are firmly clamped to the pipe and are locked in position by the at least one locking element, for providing an indication that the pipe is locked within the pipe coupling.

2. A pipe coupling according to claim 1, including elastomeric seals arranged to be operatively deformed by the grippers to seal between the pipe ends and the housing.

3. A pipe coupling according to claim 1 wherein the actuation medium is grease, and a grease nipple is attached or attachable to each annular chamber.

4. A pipe coupling according to claim 1 wherein each locking element comprises a locking ring which defines a tapered inner surface for engaging the grippers.

5. A pipe coupling according to claim 1 including means for dislodging the locking elements from the grippers so as to allow the grippers to disengage the pipe ends and release the pipes for removal from the coupling.

6. A pipe coupling according to claim 5 wherein the means for dislodging the locking elements comprises a pair of rings each of which is arranged to rotate along a pair of ramps within the housing so that suitable rotation of the rings relative to the housing causes the locking elements to be dislodged from the grippers.

7. A pipe coupling according to claim 5 wherein the means for dislodging the locking elements comprises a pair of displaceable seals engageable with the locking elements or extensions of the locking elements, and a further grease nipple for applying fluid pressure to the displaceable seals, thereby to dislodge the locking elements from the grippers.

* * * * *